United States Patent [19]

Podola et al.

[11] 4,158,122
[45] Jun. 12, 1979

[54] METHOD OF MEASURING AND STABILIZING THE DIAMETER OF HEATING POINT ON WORKPIECE IN ELECTRON BEAM WELDING MACHINE AND ON AUTOMATIC DEVICE FOR REALIZATION THEREOF

[76] Inventors: Nikolai V. Podola, ulitsa Pushkinskaya, 8, kv. 12; Alexei P. Obolonsky, ulitsa Bereznyakovskaya, 24, kv. 127; Evgeny L. Tsokol, Rusanovskaya nabereshnaya, 24/51, kv. 77, all of Kiev, U.S.S.R.

[21] Appl. No.: 795,295

[22] Filed: May 9, 1977

Related U.S. Application Data

[63] Continuation of Ser. No. 427,406, Dec. 21, 1973, abandoned.

[51] Int. Cl.² ............................................. B23K 9/00
[52] U.S. Cl. .............................................. 219/121 EB
[58] Field of Search ................... 219/121 EB, 121 EM

[56] References Cited

U.S. PATENT DOCUMENTS

| | | | |
|---|---|---|---|
| 3,134,892 | 5/1964 | Opitz et al. | 219/121 EM X |
| 3,151,231 | 9/1964 | Steigerwald | 219/121 EM |
| 3,426,174 | 2/1969 | Graham | 219/121 EM |
| 3,513,285 | 5/1970 | Imura | 219/121 EM |

*Primary Examiner*—Bruce A. Reynolds
*Assistant Examiner*—Fred E. Bell
*Attorney, Agent, or Firm*—Haseltine, Lake & Waters

[57] ABSTRACT

In the course of welding an electron welding beam is regularly deflected by means of linearly growing pulses to an electrons pickup arranged as a Faraday beam trap. As the electron beam travels in the course of deflection, it crosses the slit in the Faraday beam trap, and a signal proportional to the diameter of a heating point emerges across the trap. Depending on variations in said signal respective to a preset value, the focusing of the electron beam is also varied. The automatic device for stabilizing the heating point diameter has an electrons pickup with a resistor across its output, said pickup being connected, via a converter, to a comparison circuit also coupled with a backup signal setter. The output of the comparison circuit is connected to the focusing coil of the electron beam gun for varying the focusing coil of the electron beam. For deflecting the electron beam, there is a generator of saw-toothed pulses, connected to the deflector coil of the above electron gun.

8 Claims, 6 Drawing Figures

METHOD OF MEASURING AND STABILIZING THE DIAMETER OF HEATING POINT ON WORKPIECE IN ELECTRON BEAM WELDING MACHINE AND ON AUTOMATIC DEVICE FOR REALIZATION THEREOF

The present application is a continuation of the parent application Ser. No. 427,406, filed Dec. 21, 1973 now abandoned.

The proposed invention relates to the perfection of the methods of an electron-beam welding and more particularly to a method of measuring and stabilizing the diameter of a heating point of a workpiece in an electron-welding machine and to an automatic device for the realization thereof. The proposed method can be employed for welding articles of diverse thicknesses both in low- and high-voltage welders of any capacity.

In the description of the present invention as set forth hereinbelow, the term "electron pickup" is substantially synonymous with the term electron detection or electron pickup. The term "pulse duty ratio" means the ratio of the duration of the deflection pulse to the duration of intervals between the deflection pulses. The term "off-on time ratio" is identical to "pulse duty ratio," meaning the duration of intervals between deflection pulses. The term may be defined as a ratio of duration of a deflection pulse to the total time between deflection pulses.

It is known commonly that, to produce a quality joint in electron-beam welding, it is necessary to provide for a preset diameter value of the heating point on the surface of each of the pieces being worked, said diameter value depending on the operational requirements and properties of a material. Such value should be kept constant during welding. The diameter of the heating point is understood to be a diameter of the electron beam on the workpiece surface. In the electron welding machine, such beam is formed by an electron gun provided with a focusing coil and a deflector coil for its electron beam.

The heating point diameter should be selected experimentally by welding pilot joints in workpieces similar to those subject to welding.

The selection of the heating point diameter is an expensive and laborious operation and, as the selected diameter cannot be observed with precision in welding, the focusing is normally achieved through visual methods until the heating point diameter on a workpiece is made minimum. So, the welding is done by means of a pencil beam of electrons at point heating.

Apart from the visual focusing techniques, advantage can be also taken of such indirect signs that help achieve a required focusing accuracy as the maximum brightness of glowing of the weld crater and the maximum spitting in the welding zone. In some cases, they use another visual method of setting the heating point diameter at degraded welding currents with their subsequent rise to a working rating. Yet, the focusing accuracy being poor, such method precludes, almost completely, the possibility of the diameter control at rated current values because of an intense glowing of the welding zone.

Note should be made that the welding by means of a pencil beam of electrons results in an unstable geometry of the weld in its root portion throughout the length and in cuts in its upper portion.

To eliminate the abovementioned disadvantages of the electron-beam welding by means of a pencil beam of electrons, welding is done at a certain displacement of the focal plane relative to the joint surface to obtain more or less finite heating point. However, to produce quality weld joints, it is necessary to stabilize the diameter of the heating point in the course of welding, said heating point diameter subject to continuous size variations under the action of some disturbing factors on said electron beam.

Known presently is a method of controlling the heating point diameter with the aid of a rotating wire beam-scanner. Yet this method cannot be helpful for measurements in the course of welding, as the use of it results in the beam-scanner surface being covered with the dust of a material being welded, which causes serious errors in controlling technique due to a changed diameter of the beam-scanner and its vibration under the action of vapour coming from the welding zone. The rotating wire beam-scanner method or the similar method involving the use of an oscillating wire beam-scanner are employed for determining the diameter of the electron beam prior to welding; moreover, the heating point diameter varies uncontrolled during welding due to variations in the gun's accelerating voltage, the depth of vacuum in the welding chamber, the volume of vapour, and in some other parameters of the welding operation.

Also known are attempts to develop stabilizers of the heating point diameter, as would allow for variations in the accelerating voltage. However, such methods can take into account but one of many factors that cause variations in the diameter of the heating point.

Thus one should admit that no adequate method of stabilizing the heating point diameter directly in the course of welding has been developed so far.

Efforts taken with the view of correcting the heating point diameter manually have proved not successful because of delayed response of the operator to variations in the welding parameters, that cause variations in the heating point diameter.

An object of the present invention is to provide a method of stabilizing the diameter of a heating point, as would permit to stabilize said heating point diameter right in the course of welding with due regard for all factors causing variations in said diameter, as well as to provide a device permitting its automatic stabilization.

Another object of the invention is to help raise the accuracy of stabilizing the diameter of a heating point on a workpiece in the course of electron beam welding.

Other objects of the invention include raising the reliability and quick-action of the stabilizing system and reducing the number of operational experiments when selecting the conditions of welding.

This and other objects of the invention are accomplished by provision that, for stabilizing the diameter of a heating point on a workpiece in an electron beam welding machine by way of varying the position of the focal plane of the electron beam of an electron gun, according to the invention, right in the course of welding, they regularly deflect the electron welding beam to an electrons pickup by means of a linearly growing pulse, said electrons pickup generating pulses proportional to the duration of the pulses coming across it, so that during the migration of the beam being deflected, electrons of at least half its cross-section should come across the pickup whose output pulse duration proves to be proportional to the diameter of the electron beam, record the pickup output pulse and, once it has changed relative to a preset value, vary the position of the focal plane of the electron beam of the related gun, as a result of which the diameter of the heating point on the workpiece also varies.

An advantage offered by the proposed invention is that the diameter stabilization is effected with due regard for all disturbances causing variations in the heating point diameter directly in the course of welding, regardless of the nature of their causes.

The proposed method also permits to automatize the operation of stabilizing the heating point diameter and prepare stereotype programs for welding standard workpieces.

Besides, the proposed method offers high precision of setting the diameter of the heating point.

Saw-toothed pulses can be used in the capacity of the linearly growing pulses.

The linearly growing pulse duty ratio may range from some 1:60 to some 1:100, their duration being 5 to 100 μsec.

The proposed stabilizing method can be realized with the aid of the automatic device for stabilizing the diameter of a heating point in the electron beam machine comprising an electron beam gun with the focusing system and the deflection yoke of its electron beam. Such device of the invention comprises a generator of saw-toothed pulses, connected to the deflector coil of the electron gun for regular deflection of the electron beam, as well as an electrons pickup provided on the way of the migration of the deflected beam, that generates a signal proportional to the duration of said beam pulses coming across it, said duration depending on the diameter of the beam, and connected by its output, together with a setter of a backup signal proportional to the beam diameter being stabilized, to a comparison circuit connected by its output to the focusing coil of the electron-beam gun and generating a signal to vary the focusing depending on an error signal across its output.

The proposed device permits to take the direct measuring of the heating point diameter in the course of welding and make for all the disturbing action causing variations in the diameter of the electron beam in the welding plane regardless of the nature of their causes and achieve the stabilization of the diameter with a high accuracy.

It is practical that the electron gun should have two deflector coils arranged one after the other with a gap along the direction of the propagation of the electron welding beam and connected to a generator of saw-toothed pulses in an antiphase, while the electrons pickup should be provided in the way of the migration of the deflected beam in between the deflector coils.

In such embodiment of the invention, the electron welding beam remains permanently in the zone of the weld joint, which permits to extend the duration of deflected pulses, decrease the off-on time ratio, raise their quick-action and the accuracy of the device without affecting the depth of fusion.

Furtheron the invention will be more apparent from the description of exemplary embodiments of the method and the device for stabilizing the diameter of the heating point, and from drawings thereof, wherein:

FIG. 6 shows a part of the electron beam welding machine for welding workpieces in vacuum and a block-diagram of the automatic device for stabilizing the diameter of the heating point.

Figure 1:
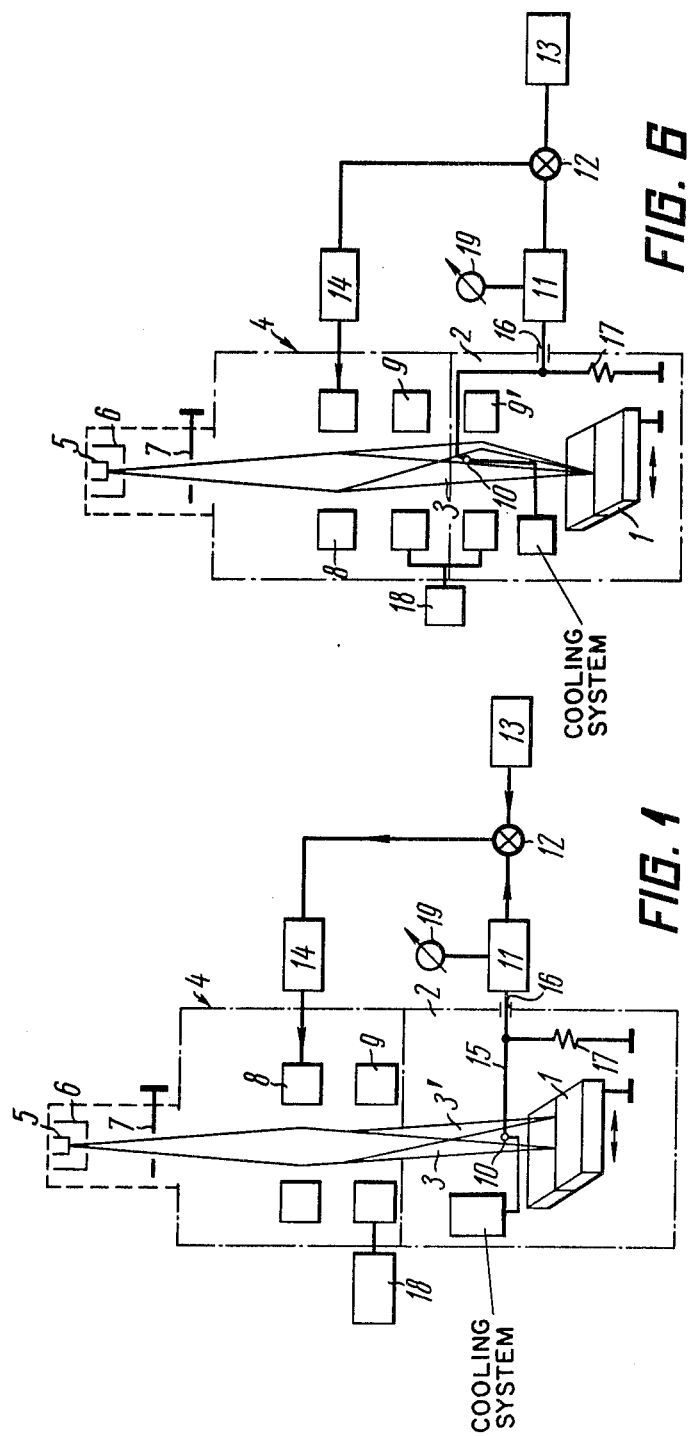
FIG. 1 shows a part of the electron beam welding machine and a block-diagram of the automatic device for stabilizing the diameter of the heating point.

A workpiece 1 (FIG. 1) being welded is arranged and travels (as shown by pointer) in a vacuum chamber 2 of the electron beam welding machine. Welding is done by means of an electron welding beam 3 shaped by an electron welding gun 4 comprising a cathode unit 5, control electrode 6 and anode 7.

The electron gun 4 is also provided with a focusing coil 8 and a deflection coil 9.

The device for stabilizing the diameter of a heating point on the workpiece 1 comprises an electrons pickup 10, converter 11 for conversion of alternating current or voltage into direct current or voltage, whose output is connected to a comparison circuit 12 also connected to a current or voltage setter 13 whose value is proportional to the value of the heating point diameter being stabilized. Used as said setter 13 can be a controllable source of direct voltage. In addition, the stabilizing device comprises an amplifier 14 of an error signal of the comparison circuit 12, said amplifier being connected to the focusing coil 8.

The electrons pickup 10 is fixed in the vacuum chamber 2 and its current lead 15 is lead out of the chamber 12 via an insulating packing bush 16. Provided in the circuit of the current lead is an electric resistor 17 connected (earthed) to the walls of the chamber 2.

Used as the electrons pickup 10 is a slit-type Faraday beam trap. The slit of the beam trap is arranged to be perpendicular to a direction in which the electron beam 3 is deflected under the action of the deflector coil 9.

Used as a pickup instead of the Faraday beam trap can be a beam-scanner made as a thin wire made of a high-heat metal, e.g., tungsten, and provided for a cooling system. Once a flux of electrons of the electron beam 3 is trapped, an electric current is induced in the circuit "pickup-resistor-earth," whose duration is proportional to the time of interaction of the electrons of the beam 3 with the pickup 10. Should the electron beam be deflected so that it crosses the slit of the Faraday beam trap or the thin wire perpendicularly to their longitudinal axis, the time of the electrons interaction with the pickup and, consequently, the output signal of said pickup would be proportional to the diameter of the electron beam.

To deflect the electron beam 3 to the pickup 10, there is a generator 18 of the linearly growing voltage pulses in the device, which is connected to the deflector coil 9. Used as the generator 19 can be a generator of saw-toothed pulses. Since the electron beam 3 is withdrawn from the weld joint zone during the deflection, it is necessary to see to it that such deflection should not affect the joint quality. It has been established that the joint quality and the measurement accuracy are high enough, the duration of the deflection being 5 to 100 μsec and the off-on time ratio being some 1:60 to some 1:100.

Depending on the welding conditions and the capacity of the welding machine, the duty ratio can differ, naturally and even rather appreciably, from the above-mentioned limits.

The converter 11 is fashioned as an electronic circuit that shapes a signal proportional to the duration of pulses in the circuit "pickup-resistor" and, consequently, proportional to the diameter of the heating point. Said converter 11 can be also made such as to help shape a direct or alternating current (voltage) signal across its output. For subsequent working, a D.C. signal is most practical. It is also possible to utilize a converter that generates an output signal as pulses in the analog or digit form. As seen from the FIG. 1, connected to the converter 11, if necessary, can be an indicator 19 of its output signal; used as indicator can be any pointer or digital instrument for current (voltage) measurements. It is practical that said instrument be calibrated in linear units, which permits to determine the heating point diameter after calibrating the device.

The invention will be more apparent from the following description of the operating principle of the device for measuring and stabilizing the diameter of the heating point on a workpiece.

Figure 2:
FIG. 2 shows the shape of pulsed transmitted by a deflection generator.
Figure 3:
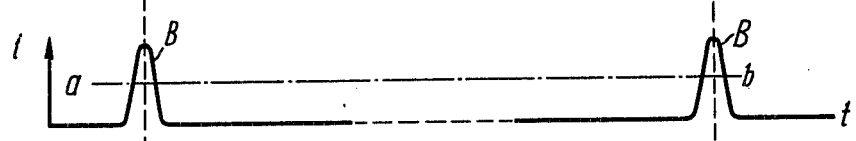
FIG. 3 shows the shape of a signal across the output of the electrons pickup.
Figure 4:
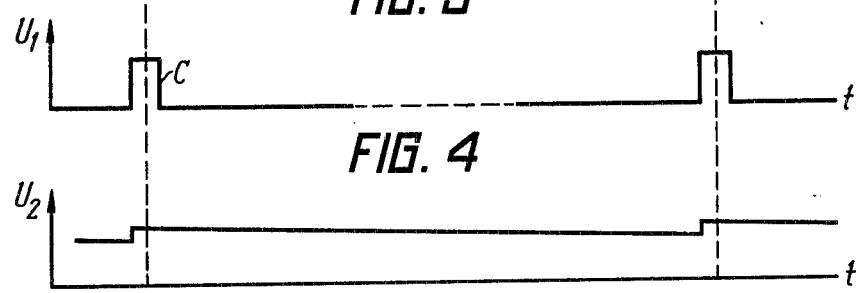
FIG. 4 shows a converted pickup signal.
Figure 5:
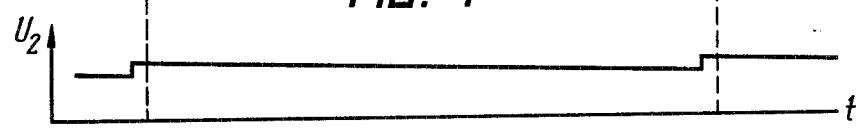
FIG. 5 shows the voltage across the converter output.

A workpiece 1 being welded is arranged in a vacuum chamber 2 and an electron gun 4 is cut in. By displacing the article 1 downward or upward or by varying the focusing of a focusing coil 8, a preset diameter of the heating point is provided. A setter 13 sets a current (voltage) rating that corresponds to the size of the diameter being stabilized. The current or voltage rating in the setter 13 is determined from the preliminary welding of pilot joints. After that, the machine is ready for welding the workpiece. By engaging the electron gun 4 they begin welding. Simultaneously, a generator 18 is cut in and saw-toothed pulses A (FIG. 2) start coming across the deflector coil 9 to cause the regular linear displacement of an electron beam 3 into a position 3'. During its migration in the course of deflection, said electron beam 3 crosses the slit of a pickup 10. As a result, current (voltage) pulses emerge across a resistor 17, shown by curves B (FIG. 3). The shape of the pulses corresponds to the distribution of electrons in the beam 3. The duration of the pulses on a certain level (line a-b) is proportional to the diameter of the heating point at a constant speed of the pickup 10. In a converter 11, the pulses B are converted into rectangular pulses C of a voltage $U_1$, convenient for subsequent working, and into constant voltage $U_2$ (FIG. 5) thereafter.

An indicator 19 serves to measure the constant voltage across the output of the converter 11. The indicator readings can be made use of for adjusting the machine for a preset diameter of the heating point.

From the converter output, the constant voltage $U_2$ is fed to a comparison circuit 12, wherein it is compared with the voltage of the setter 13. Following the amplification in an amplifier 14, an error signal induced across the output of the circuit 12 goes to the focusing coil 8; as a result, the beam focusing is varied, i.e., the position of the focal plane of the electron beam varies. In subsequent deflections of the beam 3, the measuring operation and variations in the focusing are practicable until the error signal across the output of the comparison circuit 12 disappears. Said error signal disappears upon reaching the preset diameter of the heating point.

Considered hereinabove has been a device whose use for measuring and stabilizing the heating point diameter on a workpiece in the welding plane involves the regular withdrawal of the electron beam from the weld joint zone. Besides, to reduce the losses of the power per running meter, caused by the abovementioned beam deflection, this deflection is made rarely and for a limited period of time, which affects the accuracy of measurements and necessitates the provision of a sophisticated electronic system in the converter.

FIG. 6 shows another exemplary embodiment of the device for measuring and stabilizing the heating point diameter, whose operating principle is similar to the one described above, the difference being that said another device permits to measure and stabilize the diameter of the electron beam without withdrawing the electron beam from the weld joint zone and thus eliminate the above stated disadvantages.

In the second device, a generator 18 is connected to two deflector coils 9 and 9' arranged one after the other along the axis of propagation of the electron-welding beam and having a different optical power. The both deflector coils are interconnected in an antiphase to the output of the generator 18 of saw-toothed pulses. The electrons pickup 10 is arranged between the deflector coils 9 and 9'. The rest of the device parts are similar to those shown in FIG. 1. On passing through the first deflector coil 9, the electron beam is deflected, the generator 18 being engaged, and fed to the pickup 10. As this takes place, the heating point diameter is under control in the way described above. Under the action of the second deflector coil 9', the electron beam again deflected and comes to the same point of the weld joint as in case of the absence of pulses of the generator 18.

The provision of the proposed method permits to give up the visual control by operator of the heating point diameter on a workpiece in the course of welding and raise the quality of the weld joints with a simultaneous improvement in their repeatedness from welding to welding. At the same time, welder's work is facilitated, as there is no need of watching over the bright welding zone.

Also essential is the possibility of reducing the number of operational experiments with the view of selecting proper welding conditions, as well as the possibility of giving them up completely in case of certain profiles.

What we claim is:

1. An automatic device for measuring and stabilizing a heating point in an electron-beam welding machine having an electron-beam gun with a focusing system and two deflection systems for deflecting its electron beam, comprising a generator of sawtooth pulses with two outputs connected in opposite phase to said deflection systems disposed one after the other with a spacing along the path of propagation of the welding electron beam to effect double refraction of the electron beam so that the welding beam is not withdrawn from the welding zone; an electron pickup installed across the path of movement of the beam being deflected to generate electric pulses proportional to the duration of time it receives electrons of said beam and further proportional to the beam diameter; a converter of pulse signals connected to said pickup; a comparison circuit connected at one input to the output of said converter; a setter to preset a reference signal proportional to the beam diameter being stabilized, the output of said setter being connected to the second input of said comparison circuit; the current and voltage rating of said setter being determined from preliminary welding of pilot joints; an amplifier having its output connected to said focusing system and input connected to the comparison circuit to alter focusing by varying the position of the focal plane of the electron beam depending on the error signal at its output; said error signal becoming substantially zero when said heating point attains the present diameter, said electron beam being deflected so that the duration of its passage in said pickup is measured, said electron beam remaining present even in an undeflected position for the length of an interval between deflecting pulses at the deflecting systems, said electron beam describing during the diameter measuring cycle any possible path ending at a point on a workpiece corresponding to the position of the undeflected electron beam, said electron beam being deflected during welding and passing through said pickup and returning to the welding zone, focusing accuracy of the electron beam being determined from the duration of the beam passage through the pickup for producing automatic focusing.

2. A device as claimed in claim 1, wherein said electron pickup is a slit-type of Faraday beam trap, the slit of the beam trap being perpendicular to a direction in which the electron beam is deflected.

3. A device as claimed in claim 1, wherein said electron pickup is a probe having a wire of a high-heat resistant material insulated from the case and having a cooling system.

4. A device as claimed in claim 1, wherein said converter of pulse signals to direct current voltage signals is connected between the output of the pickup and the comparison circuit, said converter comprising a pulse amplifier, a limiter, a pulse duration meter and a ripple filter.

5. A device as claimed in claim 1, wherein said setter produces direct current voltage signals proportional to the preset diameter of the heating point on a workpiece.

6. A device as defined in claim 1, wherein said electron pickup is a slit-type of Faraday beam trap; said electron pickup comprising a probe having a wire of substantially high-heat resistant material insulated from the case and having a cooling system; said converter of pulse signals to direct current voltage signals being connected between the output of said pickup and said comparison circuit, said converter comprising a pulse amplifier, a limiter, a pulse duration meter and a ripple filter; said setter producing direct current voltage signals proportional to the preset diameter of the heating point on a workpiece, said sawtooth pulses having a duty ratio in the range of 1:60 to 1:100 and a duration from 5 to 100 msec., welds applied to a workpiece having improved repeatability and quality by being free of the requirement of an operator observing the heating point diameter in the course of welding while watching over a bright welding zone.

7. A device as defined in claim 1, wherein said sawtooth pulses have a duty ratio in the range of 1:60 to 1:100 and a duration from 5 to 100 msec.

8. A device as defined in claim 1, wherein welds applied to a workpiece having improved repeatability and quality by being free of requirement of an operator to observe the heating point diameter on the workpiece by watching over a bright welding zone.

* * * * *